United States Patent [19]

Brogan

[11] Patent Number: 4,624,586

[45] Date of Patent: Nov. 25, 1986

[54] BEARING LUBRICATION DEVICE

[75] Inventor: Robert W. Brogan, Westminster, Mass.

[73] Assignee: General Electric Company, Lynn, Mass.

[21] Appl. No.: 707,284

[22] Filed: Mar. 1, 1985

[51] Int. Cl.⁴ .................. F16C 17/00; F16C 33/10
[52] U.S. Cl. .................. 384/307; 384/100; 384/399
[58] Field of Search .............. 384/99, 100, 107–113, 384/302–312, 316, 322, 398, 399, 228, 234; 184/7.4, 7.3, 105.1, 105.3; 141/1, 100; 138/90, 92

[56] References Cited

U.S. PATENT DOCUMENTS

| | | | |
|---|---|---|---|
| 1,906,715 | 5/1933 | Penick | 384/111 |
| 2,919,960 | 1/1960 | Whitney | 384/108 |
| 3,026,150 | 3/1962 | Buckley et al. | 384/111 |
| 3,533,316 | 10/1970 | Porath | 384/99 X |
| 3,583,205 | 6/1971 | Erle | 384/100 X |
| 3,612,628 | 10/1971 | Steele | 384/107 |
| 4,090,743 | 5/1978 | Suzuki et al. | 384/113 |

FOREIGN PATENT DOCUMENTS 8000171 7/1980 Netherlands ............ 384/109

Primary Examiner—Stuart S. Levy
Assistant Examiner—Thomas R. Hannon
Attorney, Agent, or Firm—James W. Mitchell

[57] ABSTRACT

A bearing for a large rotating shaft machine is subject to differing conditions of operations. In order to accommodate these differing conditions of operation, the lubricant flows throughout the bearings may have to be changed. The prior art method of changing flow distributions throughout a bearing would be to remachine orifice passageways formed in the base ring. The present invention overcomes this difficulty by proposing a standardized base ring and multi-variable orifices which can be remachined and reinserted into the base ring with minimal difficulty and machining.

7 Claims, 2 Drawing Figures

BEARING LUBRICATION DEVICE

The present invention relates in general to a bearing for large rotating shaft machinery and, in particular, to an improved lubrication device which permits uniform construction of bearing hardware while also providing customized lubrication flow to bearing surfaces.

BACKGROUND OF THE INVENTION

In general, a bearing for large rotating shaft machines comprises a base ring which is an annular structure designed to be assembled around a rotating shaft. Bearings may be designed as a journal bearing for providing a co-axial support surface for the rotating shaft or it may be a thrust bearing for providing a radial support surface for the rotating shaft in case of shaft thrusts in the axial direction. There are also combined journal and thrust bearings which is the subject of the present discussion. Further, lubricant may be required at the bearing surfaces at different flow and pressure conditions to account for the particular bearing surface being lubricated and for the particular operating condition for the bearing as a whole. The improved bearing lubrication device provides for the required flow conditions while allowing a standardized bearing assembly.

In combined journal and thrust bearings of the prior art the control of lubrication fluid, e.g.; oil, to the bearing as a whole was maintained by a plurality of screwed in orifice plugs threaded into the base ring. Several orifice plugs were positioned around the periphery of the base ring (one per journal pad). The oil flow to each journal pad was controlled by a radial orifice hole drilled into the base ring. The oil flow to the thrust bearing surfaces was controlled by orifice holes machined into opposite ends of the base ring. The size of each orifice hole was changed on each application due to changes in oil flow requirements dictated by design conditions.

SUMMARY OF THE INVENTION

In combined journal and thrust bearings, the base rings have ports machined radially into the base ring which are circumferentially spaced from one another. Into each of these ports is inserted a multi-variable orifice plug which controls the total flow into the bearing ring and also the respective flows to the journal surfaces and to each of the thrust surfaces. If an alteration to the flow is desired, the base ring need not be redesigned or remachined but rather the change can be made to the orifice plug which is then substituted into the base ring to meet the new flow requirements.

OBJECTS OF THE INVENTION

It is an object of the invention to provide a new lubricant supply device for a bearing assembly which uses a standardized base ring design and a customized orifice plug.

It is another object of the invention to provide an improved bearing design where changes in flow requirements are met by changes to the orifice plug design rather than by alterations to the base ring.

It is another object of the invention to eliminate remachining or replacement of the base ring to change orifice size.

Another object of the invention allows stocking of standard base rings which can be customized to a given application by inserting the proper multi-variable orifice plugs.

It is another object of the invention to minimize planning-tapes and drawings previously required for multiple base ring designs.

The above, and other objects, features and advantages of the present invention will become apparent from the following description read in conjunction with the accompanying drawings in which like reference numerals designate the same elements.

DETAILED DESCRIPTION OF THE INVENTION

Figure 1:
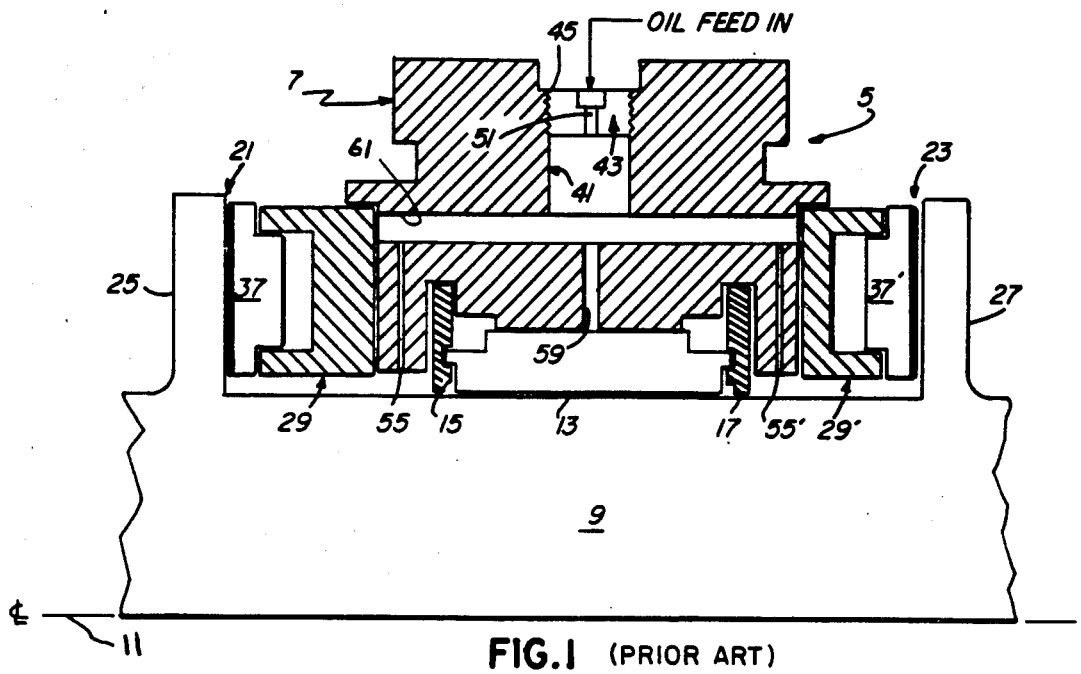
FIG. 1 shows the upper shaft and upper half bearing assembly according to the prior art.

According to the prior art and in review of FIG. 1, a bearing assembly 5 in accordance with the prior art includes an annular base ring 7 which surrounds a rotating shaft 9 which is shown as cut at its centerline 11. Thus the upper half of the base ring 7 is shown in section detail. The bearing assembly 5 also includes a journal bearing surface 13 which may actually include a plurality of individual axially-oriented pads which are circumferentially arranged about the rotating shaft. The journal bearing may have slotted openings (not shown) between individual pads to allow the flow of lubricant to the pad surfaces. The number of pads and the exact arrangement and method of attachment to the base ring are well known in the art. There may be a pair of annular seals 15 and 17 at each end of the journal bearing surface.

There may also be thrust bearing surfaces 21 and 23 at one or both ends of the bearing base ring 7. These thrust bearing surfaces are annular and arranged to abut thrust collars 25 and 27 respectively which are part of the rotating shaft. At each end of the bearing ring, there is an annular cage assembly 29 and 29'. The respective cages retain a plurality of arcuate-shaped thrust pads 37 and 37' which provide the thrust surfaces at each end of the bearing assembly. Moreover, lubrication to the thrust surfaces from behind the pads is provided through slots or other apertures between the pads in a well-known manner.

Lubricant is fed into the base ring through a plurality of ports 41 (only one shown) which are located around the circumference of the base ring at spaced intervals. There may be as many individual ports as there are individual journal bearing pads. An orifice plug 43 is inserted into each port and may include screw threads 45 to secure the connection. Thus the number of plugs equals the number of ports in one example. Each orifice plug includes an orifice 51 which controls fluid or lubricant flow into the base ring but not necessarily to the individual bearing surfaces.

Flow control to the individual bearing surfaces is achieved by individual orifice holes which are drilled into the base ring as follows. Thrust orifice holes 55 and 55' are drilled into the base ring at opposite ends of the base ring whereas journal orifice holes 59 are drilled into the center of the base ring. Realizing that the base ring is an annular member, the reader is reminded that the orifice holes are disbursed about the base ring much like the spokes of a wheel and may for example equal the number of pads. Finally, lubricant is disbursed from the orifice plug to the individual orifice holes through axial passageway 61 drilled into the base ring and as indicated by the flow arrows. Axial passageways differ from orifice holes in that they do not control lubricant flow but merely direct such flow. Thus extensive machining is required for each bearing in accordance with the required flow conditions of lubricant and each bearing ring must be custom machined.

Figure 2:
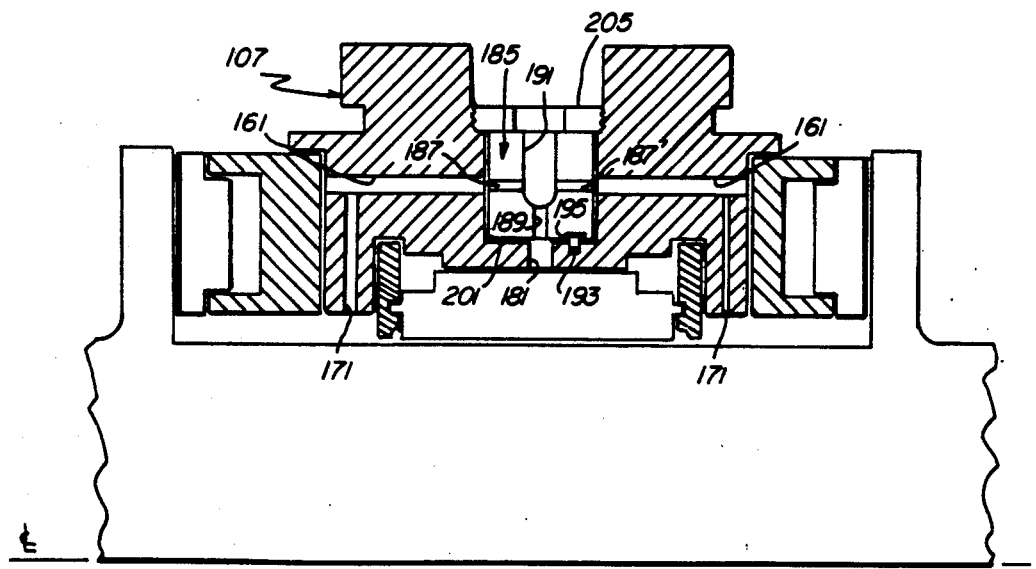
FIG. 2 shows a cross section of an improved bearing lubrication device in accordance with the present invention.

FIG. 2 is a cross-section of a base ring showing an improved orificing plug and base ring design in accordance with the present invention. Base ring 107 corresponds with base ring 7 except that there are no orifice holes machined into the ring. Axial passageways 161 (there are several about the base ring) accommodate all flows to the thrust bearings in combination with radial passageways 171 or slots which channel lubricant to the thrust bearings through the annular cage (not shown). Flow to the journal bearing surface is through radial passages 181 (only one shown). Both the axial and radial passageways are designed for maximum flow and do not provide a metering function similar to orifice holes.

Flow regulation in accordance with the present invention is accomplished through an orifice plug 185 which includes in its construction thrust orifice holes 187 and 187' for the separate control of lubrication flow to each of the thrust bearing surfaces and a journal orifice hole 189 controlling flow to the journal bearing surfaces. A central bore 191 is formed in the orifice plug to deliver fluid to the various orifices. A locator pin 193 locates the plug in its required orientation with respect to passageways 161 and a hole 195 provides a receptacle for the locator pin.

It is an important aspect of the invention that the plug 185 be seated in a socket 201 formed in the bearing ring. The seating of plug 185 in the socket 201 prevents fluid intended for the journal bearing at a flow controlled by orifice hole 189 from discharging to other portions of the bearing assembly. Thus the socket provides a seal for the orifice plug.

A fastener such as a threaded washer or retainer ring 205 is used to hold the orifice plug in place. Alternatively, a snap ring fastener could be substituted for the retainer ring to maintain the plug in place.

The operation of the invention is clear from the foregoing description. To reinforce the advantages thereof, the total flow into a standardized base ring may be altered by replacing orifice plug 185 with an identical alternate other plug (not shown) except that the alternate plug would have a dimensionally different central bore 191. This would alter the total flow. Journal orifice hole 189 may be different from thrust orifice holes 187 and 187' and even the thrust orifice holes 187 and 187' may differ in size from one another depending upon lubrication requirements. One aspect of the invention is to allow customized flows to different bearing surfaces both without changing the configuration of the base ring. Hence to change the flow and pressure of lubricant, only the plugs need to be changed. Thus a standard base can be customized by simply redesigning and replacing the orifice plugs.

Having described preferred embodiments of the invention with reference to the accompanying drawings, it is to be understood that the invention is not limited to those precise embodiments and that various changes and modifications may be affected therein by one skilled in the art without departing from the scope of the invention as defined in the appended claims.

What is claimed is:

1. An improved lubrication device for a combined journal and thrust bearing which includes a base ring having a plurality of spaced apart radially extending fluid feed ports; said base ring further including a plurality of interior passageways connecting the fluid feed ports with journal bearing surfaces and thrust bearing surfaces and wherein the improvement comprises:
    alternative orifice plugs for selective insertion into fluid feed ports; each of said orifice plugs being designed to provide different lubrication flows and pressures to both thrust and journal bearings by selective insertion and removal into the fluid feed ports and without changing interior passageway dimensions.

2. The device recited in claim 1 wherein each orifice plug includes a journal orifice and at least one thrust orifice.

3. The device recited in claim 2 wherein the interior passageways include a plurality of axially extending holes feeding the thrust bearings and a plurality of radially extending holes feeding the journal bearings and wherein the improvement further comprises:
    a plurality of sockets formed in the interior of the base ring each aligned with a respective fluid feed port; each socket being in fluid communication with a journal bearing surface through a radial hole whereby after the orifice plug is inserted into the feed port and socket, radial flow through the journal orifice is directed to the journal bearings and axial flow through the thrust orifice is directed to the thrust bearings.

4. The device recited in claim 3 wherein each base ring socket includes a staking pin and each orifice plug includes a hole whereby the orifice plug is properly aligned in the port and socket by inserting the staking pin into the plug hole.

5. The device recited in claim 3 further including a fastener in said port mounted radially outwardly of said plug whereby the plug is securely retained in the socket.

6. A bearing assembly comprising:
    a base ring including a plurality of circumferentially spaced apart radially extending fluid feed ports;
    interior fluid passageways formed in the base ring connecting the fluid feed ports with bearing surfaces:
    an orifice plug inserted into each fluid feed port, each orifice plug including internal orifices communicating with interior fluid passageways for selective feed to journal and thrust surfaces respectively; and,
    a plurality of sockets formed in the interior of the base ring aligned with the fluid ports whereby the orifice plugs are each inserted through its respective fluid ports into a socket.

7. An improved lubrication device for a combined thrust and journal bearing assembly which includes a base ring having a plurality of circumferentially spaced apart radially extending fluid feed ports; said base ring including interior fluid passageways connecting the fluid feed ports with bearing surfaces and wherein the improvement comprises:
    at least two orifice plugs having different size orifices for selective insertion into fluid feed ports each orifice plug having at least one orifice for supplying fluid to the journal surfaces and at least one orifice for supplying fluid to the thrust surfaces whereby lubrication fluid flow and pressure to the bearing surfaces may be changed by selection of the desired orifice plug and without altering the interior passageways.

* * * * *